US010344453B2

(12) United States Patent
Binstock et al.

(10) Patent No.: US 10,344,453 B2
(45) Date of Patent: Jul. 9, 2019

(54) JOYSTICK CONTROLLER FOR POWER MACHINE

(71) Applicant: Clark Equipment Company, West Fargo, ND (US)

(72) Inventors: Mark W. Binstock, Bismarck, ND (US); Scott J. LaCoe, Bismarck, ND (US)

(73) Assignee: Clark Equipment Company, West Fargo, ND (US)

(*) Notice: Subject to any disclaimer, the term of this patent is extended or adjusted under 35 U.S.C. 154(b) by 123 days.

(21) Appl. No.: 15/227,344

(22) Filed: Aug. 3, 2016

(65) Prior Publication Data

US 2017/0037599 A1 Feb. 9, 2017

Related U.S. Application Data

(60) Provisional application No. 62/200,247, filed on Aug. 3, 2015.

(51) Int. Cl.
*E02F 9/20* (2006.01)
*G05G 9/047* (2006.01)
(Continued)

(52) U.S. Cl.
CPC ............ *E02F 9/2004* (2013.01); *G05G 1/04* (2013.01); *G05G 9/02* (2013.01); *G05G 9/047* (2013.01); *G05G 25/00* (2013.01); *E02F 3/34* (2013.01)

(58) Field of Classification Search
CPC ............ G05G 9/02; G05G 1/04; G05G 25/00; G05G 9/047; E02F 9/2004; E02F 3/34
See application file for complete search history.

(56) References Cited

U.S. PATENT DOCUMENTS 5,804,781 A * 9/1998 Okabe ............... G05G 9/047
200/6 A
6,460,640 B1 * 10/2002 Keagle ............... A01B 51/02
180/19.3
(Continued)

FOREIGN PATENT DOCUMENTS

EP 1801686 A2 6/2007
JP 2000333310 A * 11/2000
(Continued)

OTHER PUBLICATIONS

International Search Report and Written Opinion dated Oct. 27, 2016 for International Application No. PCT/US2016/045301 filed Aug. 3, 2016, 11 pages.
(Continued)

Primary Examiner — Paul N Dickson
Assistant Examiner — Timothy Wilhelm
(74) Attorney, Agent, or Firm — John D. Veldhuis-Kroeze; Westman, Champlin & Koehler, P.A.

(57) ABSTRACT

Joystick controllers having one or both of a reference bar and a throat plate. The reference bar substantially surrounds the joystick and is mounted to a control panel, and provides a hand rest surface for an operator while operating the joystick. A top curved surface of the reference bar extends substantially parallel to the path of movement of the joystick in the fore and aft direction of travel. The throat plate has a shape oriented with tapered surfaces and vertices at the furthest fore and aft points to limit turning, caused by movement of the joystick in a side-to-side direction, at higher forward and aft speeds. The joystick can be biased such that, in the neutral position, it is oriented aft of center to allow for a full forward stroke, while limiting rearward stroke.

13 Claims, 13 Drawing Sheets

(51) Int. Cl.
  *G05G 1/04* (2006.01)
  *G05G 9/02* (2006.01)
  *G05G 25/00* (2006.01)
  *E02F 3/34* (2006.01)

(56) References Cited

U.S. PATENT DOCUMENTS

| | | | | |
|---|---|---|---|---|
| 6,601,386 | B1* | 8/2003 | Hori | E02F 9/2004 |
| | | | | 137/636.2 |
| 6,709,223 | B2* | 3/2004 | Walto | B62D 51/04 |
| | | | | 180/19.1 |
| 6,789,574 | B2* | 9/2004 | Tsou | B66C 13/20 |
| | | | | 137/596.1 |
| 6,902,016 | B2* | 6/2005 | Bares | B60K 23/00 |
| | | | | 180/19.3 |
| 7,059,434 | B2* | 6/2006 | Bares | E02F 9/2004 |
| | | | | 180/19.1 |
| 7,178,623 | B2* | 2/2007 | Ginzel | B60K 20/02 |
| | | | | 180/315 |
| 7,549,500 | B2* | 6/2009 | Graham | E02F 9/2004 |
| | | | | 180/321 |
| 8,037,952 | B2* | 10/2011 | Bock | E02F 9/2004 |
| | | | | 180/19.1 |
| 8,109,356 | B2* | 2/2012 | Brock | E02F 9/2025 |
| | | | | 180/305 |
| 9,536,689 | B2* | 1/2017 | Noh | H01H 25/04 |
| 9,637,222 | B2* | 5/2017 | Peterson | B64C 13/04 |
| 2005/0036876 | A1* | 2/2005 | Walto | B62D 51/04 |
| | | | | 414/724 |
| 2006/0102392 | A1* | 5/2006 | Johnson | A61G 7/08 |
| | | | | 180/19.1 |
| 2015/0300269 | A1* | 10/2015 | Vary | F02D 41/08 |
| | | | | 74/522 |
| 2016/0009174 | A1* | 1/2016 | Yamauchi | B60K 26/02 |
| | | | | 74/473.3 |
| 2016/0244937 | A1* | 8/2016 | Azure | E02F 3/3405 |
| 2016/0283078 | A1* | 9/2016 | Lin | G06F 3/0488 |

FOREIGN PATENT DOCUMENTS

| | | |
|---|---|---|
| JP | 2000333310 A | 11/2000 |
| WO | 2007030243 A1 | 3/2007 |

OTHER PUBLICATIONS

Communication from the European Patent Office dated Mar. 16, 2018 for European Application No. 16751748.1, 3 pages.

* cited by examiner

JOYSTICK CONTROLLER FOR POWER MACHINE

CROSS-REFERENCE TO RELATED APPLICATION

This application claims the benefit of U.S. Provisional Application No. 62/200,247, filed on Aug. 3, 2015.

FIELD

Disclosed embodiments relate to power machines that utilize joysticks or similar steering control devices for operating the machine.

BACKGROUND

Power machines, such as tracked mini-loaders or other loaders are traditionally steered by an operator through the use of one or a pair of manipulable drive control levers or joysticks, which are electrically, mechanically, hydraulically, or otherwise coupled to one or more drive pumps. The one or more drive pumps are provided to control tractive effort to at least one of the axles on the machine. Manipulating the one or more joysticks controls both the speed and direction of the power machine. In addition to providing control of speed during forward travel, the joystick(s), in some instances can control reverse travel or turning of the power machine, or both.

The discussion above is merely provided for general background information and is not intended to be used as an aid in determining the scope of the claimed subject matter.

SUMMARY

Disclosed embodiments include joystick controllers having one or both of a reference bar and a throat plate. The reference bar substantially surrounds the joystick and is mounted to a control panel and provides a hand rest surface for an operator while operating the joystick. In some embodiments, a top curved surface of the reference bar extends proximal to the path of movement of the joystick in one or both of the fore and aft direction of travel and the side to side direction of travel. In some embodiments, the throat plate has a shape oriented with tapered surfaces and vertices at the furthest fore and aft points to limit turning, caused by movement of the joystick in a side-to-side direction, at higher forward and aft speeds. The joystick can be biased such that, in the neutral position, it is oriented aft of center to allow for a full forward stroke, while limiting rearward stroke.

In some exemplary embodiments, a power machine is provided comprising a frame and a joystick mounted to the frame. The joystick is biased to a neutral position and configured to be moved fore and aft of the neutral position such that, from the neutral position, a range of allowed joystick movement in a fore direction to a most fore position is greater than a range of allowed joystick movement in an aft direction to a most aft position.

In some exemplary embodiments, the joystick is a two-axis joystick, and the power machine includes a joystick range of movement limiting mechanism configured to define a total range of movement of the two-axis joystick. The joystick range of movement limiting mechanism can include a throat plate in a control panel, with the throat plate having an aperture and the two-axis joystick extending through the aperture. In some embodiments, the throat plate aperture has tapered fore end surfaces and tapered aft end surfaces to reduce left and right movement of the joystick as the joystick approaches the most fore position and the most aft position. In some exemplary embodiments, the throat plate has side surfaces, between the tapered fore end surfaces and tapered aft end surfaces, spaced apart such that left and right movement of the joystick is not reduced by the throat plate in intermediate joystick positions fore and aft of the neutral position.

In some exemplary embodiments of the power machine, a reference bar is coupled to the control panel and surrounds the two-axis joystick. The reference bar has a curved top surface extending between a fore most reference bar position and an aft most reference bar position. Curvature of the reference bar in the arcuate manner between the fore most reference bar position and the aft most reference bar position can be such that the reference bar extends proximal to a path of movement of the two-axis joystick in the fore and aft directions of travel.

In another exemplary embodiment, a power machine comprises a frame, a control panel, a throat plate in the control panel, and a two-axis joystick mounted to the frame and extending through an aperture of the throat plate. The two-axis joystick can be biased to a neutral position and configured to be moved fore and aft of the neutral position and left and right of the neutral position. In some exemplary embodiments, the throat plate aperture is shaped to allow a range of joystick movement in a fore direction to a most fore position and in an aft direction to a most aft position, wherein the throat plate aperture is shaped to limit left and right movement of the joystick at the most fore position and at the most aft position relative to allowed left and right movement adjacent the neutral position. In some exemplary embodiments, the throat plate aperture has tapered fore end surfaces and tapered aft end surfaces to reduce left and right movement of the joystick as the joystick approaches the most fore position and the most aft position.

In some exemplary embodiments, the power machine has tractive elements; at least one drive motor coupled to the tractive elements and configured to move the tractive elements to selectively cause forward and reverse travel of the power machine and to selectively cause left and right turns of the power machine; and a control system operatively coupling the two-axis joystick and the at least one drive motor and configured such that movement of the two-axis joystick fore and aft of the neutral position causes respectively forward and reverse travel of the power machine with increasingly higher speeds at joystick positions increasingly further from the neutral position, and such that movement of the two-axis joystick left and right of the neutral position causes the power machine to turn respectively left and right. In some such exemplary embodiments, the tapered fore end surfaces and tapered aft end surfaces increasingly limit sharpness of left and right turns at increasingly higher power machine speeds corresponding to joystick fore and aft positions increasingly further from the neutral position. In some exemplary power machine embodiments, the neutral position of the two-axis joystick is oriented aft of a center position between the most fore position and the most aft position such that a range of allowed joystick movement in the fore direction and corresponding forward travel speeds are greater than a range of allowed joystick movement in the aft direction and corresponding reverse travel speeds.

In some exemplary embodiments, the power machine further includes a reference bar coupled to the control panel and surrounding the two-axis joystick, wherein the reference bar has a curved top surface extending between a fore most reference bar position and an aft most reference bar position. The reference bar can curve in an arcuate manner between the fore most reference bar position and the aft most reference bar position and extends proximal to a path of movement of the two-axis joystick in the fore and aft directions of travel. In some embodiments, between the fore most reference bar position and the aft most reference bar position, the reference bar has a radius, relative to a pivot point of the two-axis joystick, which is substantially the same as a radius of a fixed point on the joystick relative to the pivot point, such that in all positions of the joystick between the aft most position and the fore most position, the joystick extends above the reference bar by substantially the same amount.

In some exemplary embodiments, provided is a reference bar configured to be coupled to a control panel of a power machine surrounding a joystick extending through the control panel, with the reference bar comprising a curved top surface. The reference bar has a radius, relative to a pivot point of the joystick, which is substantially the same as a radius of a fixed point on the joystick relative to the pivot point. In some exemplary embodiments, the reference bar curves in an arcuate manner such that in all positions of the joystick, the joystick extends above the reference bar by substantially the same amount. In some exemplary embodiments, the curved top surface of the reference bar extends between a fore most reference bar position and an aft most reference bar position, and between the fore most reference bar position and the aft most reference bar position, the reference bar radius, relative to the pivot point of the joystick, is substantially the same as the radius of the fixed point on the joystick relative to the pivot point. In some exemplary embodiments, the curved top surface of the reference bar further extends between a left most reference bar position and a right most reference bar position, and between the left most reference bar position and the right most reference bar position, the reference bar radius, relative to the pivot point of the joystick, is substantially the same as the radius of the fixed point on the joystick relative to the pivot point. In some exemplary embodiments, between the fore most reference bar position and the aft most reference bar position, at least one of left and right portions of the reference bar curve laterally.

This Summary and the Abstract are provided to introduce a selection of concepts in a simplified form that are further described below in the Detailed Description. This Summary is not intended to identify key features or essential features of the claimed subject matter.

DETAILED DESCRIPTION

Before any embodiments of the invention are explained in detail, it should be understood that the invention is not limited in its application to the details of construction and the arrangement of components set forth in the following description or illustrated in the following drawings. The invention is capable of other embodiments and of being practiced or of being carried out in various ways. Also, it should be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Disclosed embodiments provide joystick control features for power machines such as loaders. For example, one or more disclosed joystick features can be used with mini-loaders such as walk behind mini-loaders, ride on mini-loaders, or other types of loaders. The joystick control or features, which can be located on a control panel of the machine in exemplary embodiments, can be used with other power machines as well for controlling power machine functions such as forward and reverse travel and speed, turning, and attached implement functions.

Figure 1:
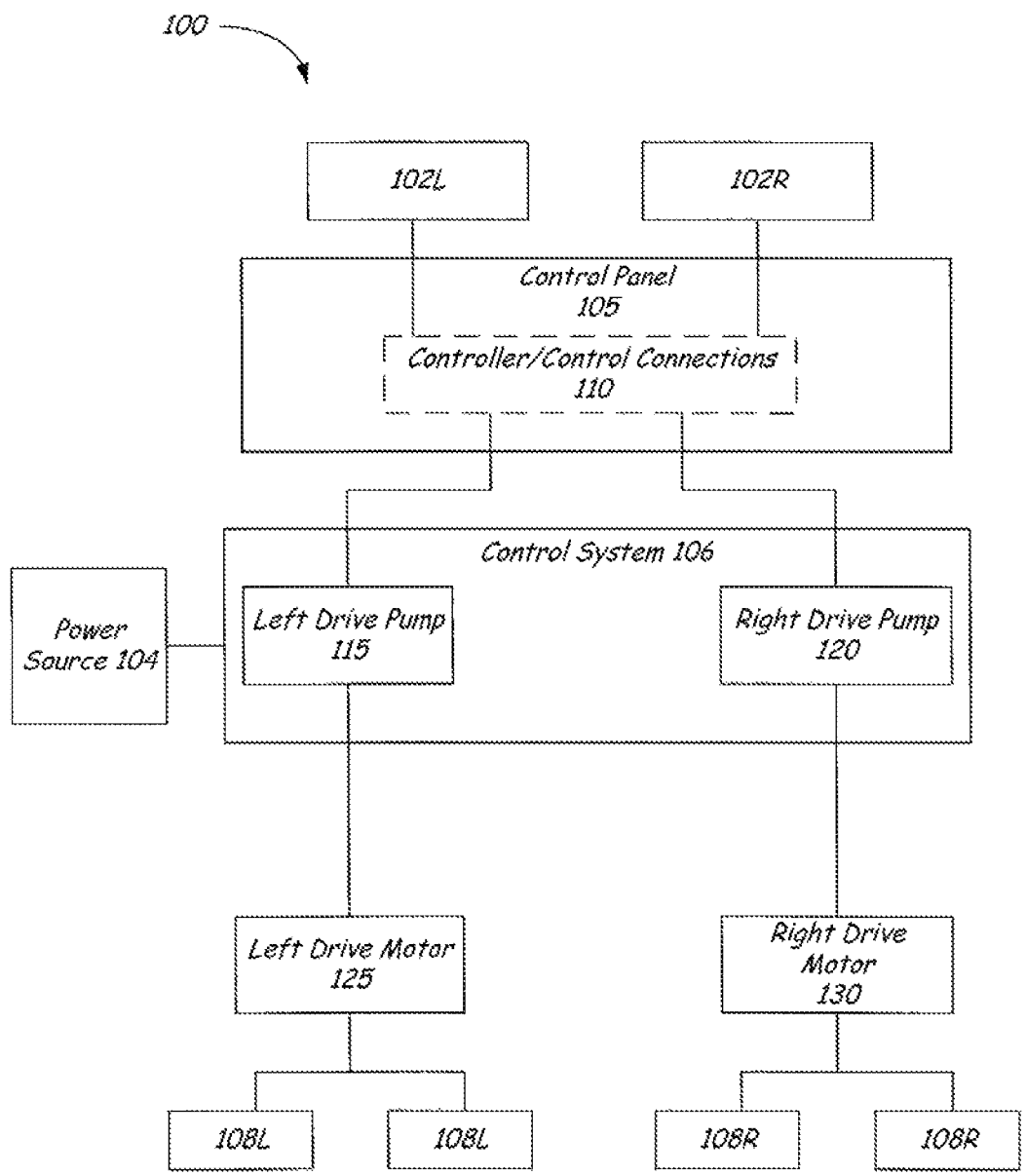
FIG. 1 is a block diagram illustrating portions of a control system of the power machine upon which embodiments of the present disclosure can be advantageously practiced.

FIG. 1 is a schematic diagram of portions a power machine 100 upon which the embodiments disclosed below can be advantageously employed. Power machine 100 is representative of a number of different types of power machines including, but not necessarily limited to, walk behind loaders. Power machine 100 includes, in an exemplary embodiment, left and right joystick controllers or joystick input devices 102L and 102R located on a control panel 105, a power source 104, a control system 106 including left drive pump 115 and right drive pump 120, a left drive motor 125 and a right drive motor 130, and left side tractive elements 108L and right side tractive elements 108R.

In some embodiments, power source 104 is an internal combustion engine, though other power sources can also be used, such as those using electricity or other sources of energy. Control system 106 is operably coupled to the power source 104, receives power from the power source 104, and converts the received power to signals that operate functional components of the power machine. In some embodiments, the control system 106 includes hydraulic components such as one or more hydraulic pumps (e.g., left and right drive pumps 115 and 120) that are configured to provide pressurized hydraulic fluid to various motors, actuators, and valve components that are illustratively employed to control the flow of hydraulic fluid to some or all of the motors and actuators used to control functional components of the power machine 100. Other types of control systems are contemplated. For example, the control system 106 can include electric generators or the like to generate electrical control signals to power electric actuators. For the sake of simplicity, the motors and actuators disclosed herein are referred to as hydraulic or electrohydraulic motors and actuators, but other types of motors and actuators can be employed in some embodiments.

Left and right joystick operator inputs 102L and 102R located on a control panel 105 are operatively coupled to control connections 110 to provide inputs or input signals, indicative of the actuation of the inputs by an operator, to the control system 106 to control left and right drive pumps 115 and 120. Control connections can include electrical, mechanical or other connections, a controller, or other devices. Left and right drive pumps 115 and 120 are illustratively variable displacement pumps that are in hydraulic communication with left drive motor 125 and right drive motor 130, respectively. Control connections 110 illustratively provide output signals to control the left and right drive pumps 115 and 120 to provide hydraulic fluid to the left and right drive motors 125 and 130 to cause the left and right drive motors to rotate in a clockwise or counterclockwise direction at a rate determined by the drive control operator inputs 102L and 102R. Left drive motor 125 is coupled to tractive elements 108L and right drive motor 130 is coupled to tractive elements 108R. Tractive elements 108L and 108R can be continuous tracks (with one or more such tracks on each side of the machine), pairs of wheels, or other forms of tractive elements. The left and right drive pumps 115 and 120 can be energized to cause the tractive elements 108L and 108R to act against each other by operating at different speeds and/or directions to accomplish steering by skidding.

Figure 2:
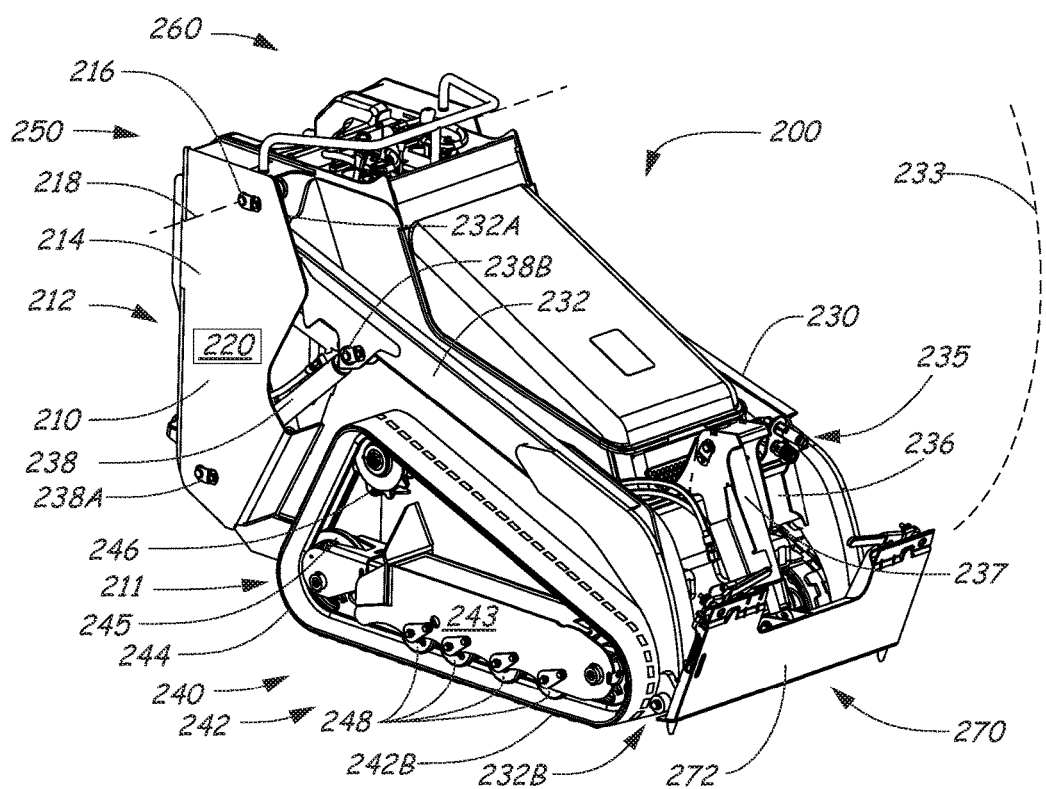
FIGS. 2-3 are perspective illustrations of a power machine upon which the embodiments of the present disclosure can be advantageously practiced.
Figure 3:
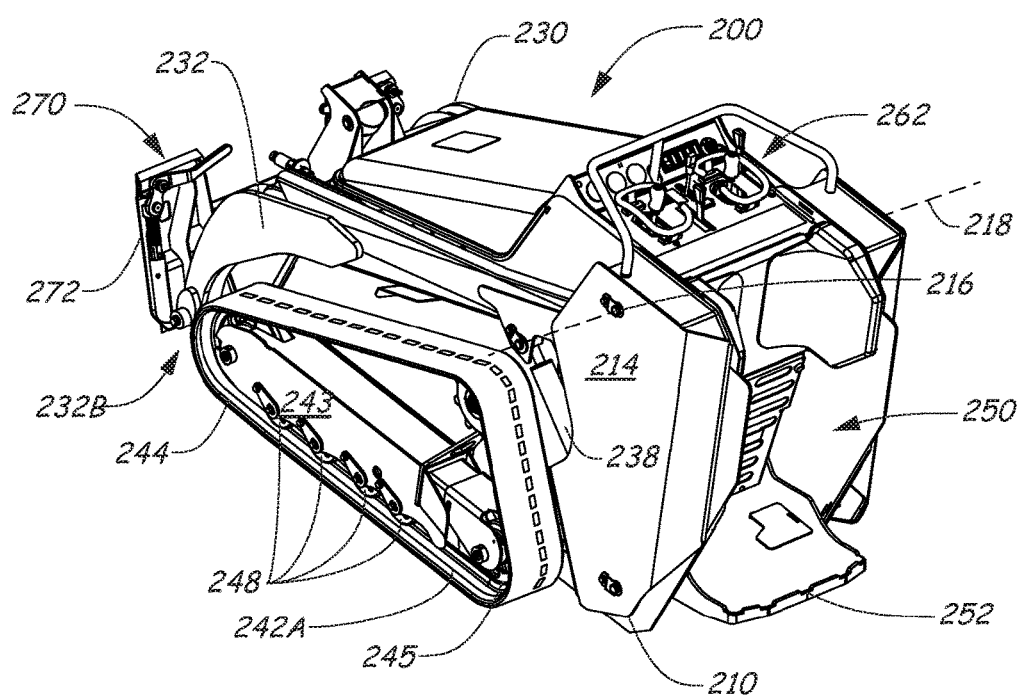

FIGS. 2-3 illustrates a loader 200, which is one particular example of a power machine of the type illustrated in FIG. 1 where the embodiments discussed below can be advantageously employed. Loader 200 is a tracked loader and more particularly, a mini-loader. A mini-loader for the purposes of this discussion is a small loader without an operator cab that can be operated from an operator station at the back of the loader. Some mini-loaders have a platform on which an operator can ride on. Other mini-loaders can be operated by an operator who walks behind the loader. Still other mini-loaders have a platform that is moveable or removable to allow an operator to alternatively ride on the platform or walk behind the loader. The loader 200 is a tracked loader, in some embodiments mini-loaders can be wheeled loaders as well.

Track loader 200 is one particular example of the power machine 100 illustrated broadly in FIG. 1 and discussed above. To that end, features of loader 200 described below include reference numbers that are generally similar to those used in FIG. 1. For example, loader 200 is described below as having a frame 210, just as power machine 100 has a frame 110. Track loader 200 is described herein to provide a reference for understanding one environment on which the embodiments described below related to operator controls may be practiced. The loader 200 should not be considered limiting especially as to features that loader 200 may have described herein that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

As mentioned above, loader 200 includes frame 210. Frame 210 supports a power system 220, the power system being capable of generating or otherwise providing power for operating various functions on the power machine. Frame 210 also supports a work element in the form of a lift arm structure 230 that is selectively powered by the power system 220 in response to signals from an operator control system 260 and is capable of performing various work tasks. As loader 200 is a work vehicle, frame 210 also supports a traction system 240, which is also selectively powered by power system 220 in response to signals from operator control system 260. The traction system 240 is capable of propelling the power machine over a support surface. The lift arm structure 230 in turn supports an implement carrier 272, which is capable of receiving and securing various implements to the loader 200 for performing various work tasks. The loader 200 can be operated from an operator station 250 from which an operator can manipulate various control devices to cause the power machine to perform various functions, discussed in more detail below. Frame 210 also supports a work element in the form of a lift arm structure 230 that is powered by the power system 220 and is capable of performing various work tasks.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214 located on either side and toward the rear of the mainframe that support a lift arm structure 230 and to which the lift arm structure 230 is pivotally attached. The lift arm structure 230 is illustratively pinned to each of the upright portions 214. The combination of mounting features on the upright portions 214 and the lift arm structure 230 and mounting hardware (including pins used to pin the lift arm structure to the mainframe 212) are collectively referred to as joints 216 (one is located on each of the upright portions 214) for the purposes of this discussion. Joints 216 are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242 on either side of the loader 200, which on loader 200 are track assemblies.

The lift arm structure 230 shown in FIGS. 2-3 is one example of many different types of lift arm structures that can be attached to a power machine such as loader 200 or other power machines on which embodiments of the present discussion can be practiced. The lift arm structure 230 has a pair of lift arms 232 that are disposed on opposing sides of the frame 210. A first end 232A of each of the lift arms 232 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a radial travel path, shown generally by arrow 233. For the purposes of this discussion, the travel path 233 of the lift arm structure 230 is defined by the path of movement of the second end 232B of the lift arm structure.

The lift arms 232 are each coupled to a cross member 236 that provides increased structural stability to the lift arm structure 230. A pair of actuators 238, which on loader 200 are hydraulic cylinders configured to selectively receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 233. The lift arm structure 230 shown in FIGS. 2-3 is representative of one type of lift arm structure that may be coupled to the power machine 200. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has two portions (as opposed to the single piece lift arms 232) that are pivotally coupled to each other along with a control arm to create a four-bar linkage and a substantially vertical travel path or at least more vertical than the radial path of lift arm structure 230. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIGS. 2-3. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 232B of each of the arms 232. An implement carrier actuator 237 is operably coupled the lift arm structure 230 and the implement carrier 272 and are operable to rotate the implement carrier with respect to the lift arm structure. Other examples of power machines can have a plurality of implement carrier actuators. Still other examples of power machines of the type that can advantageously employ the disclosed embodiments discussed herein may not have an implement carrier that is capable of accepting and securing a variety of different attachments, but instead may allow only for implements to be directly attached to its lift arm structure.

The implement interface 270 also includes an implement power source 235 available for connection to an implement on the lift arm structure 230. The implement power source 235 includes pressurized hydraulic fluid ports to which an implement can be coupled. The pressurized hydraulic fluid port selectively provides pressurized hydraulic fluid for powering one or more functions or actuators on an implement. The implement power source can, but need not, include an electrical power source for powering electrical actuators and/or an electronic controller on an implement. The electrical power source can also include electrical conduits that are in communication with a data bus on the loader 200 to allow communication between a controller on an implement and electronic devices on the loader 200. It should be noted that the specific implement power source on loader 200 does not include an electrical power source.

The lower frame 211 supports and has attached to it a pair of tractive elements, identified in FIGS. 2-3 as left track assembly 242A and right track assembly 242B (collectively tractive elements 242). Each of the tractive elements 242 has a track frame 243 that is coupled to the frame 210. The track frame 243 supports and is surrounded by an endless track 244, which rotates under power to propel the loader 200 over a support surface. Various elements are coupled to or otherwise supported by the track frame 243 for engaging and supporting the endless track 244 and cause it to rotate about the track frame. For example, a sprocket 246 is supported by the track frame 243 and engages the endless track 244 to cause the endless track to rotate about the track frame. An idler 245 is held against the track 244 by a tensioner (not shown) to maintain proper tension on the track. The track frame 243 also supports a plurality of rollers 248, which engage the track and, through the track, the support surface to support and distribute the weight of the loader 200.

An operator station 250 is positioned toward the rear of the frame 210. A platform 252 is provided for the operator to stand. While standing on the platform 252, and operator has access to a plurality of operator control inputs 262 that, when manipulated by the operator, can provide control signals to control work functions of the power machine 200, including, for example, the traction system 240 and the lift arm 230. Operator control inputs 262 can include joysticks with adjacent reference bars of the type discussed below.

Display devices 264 are provided in the operator station to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 4:
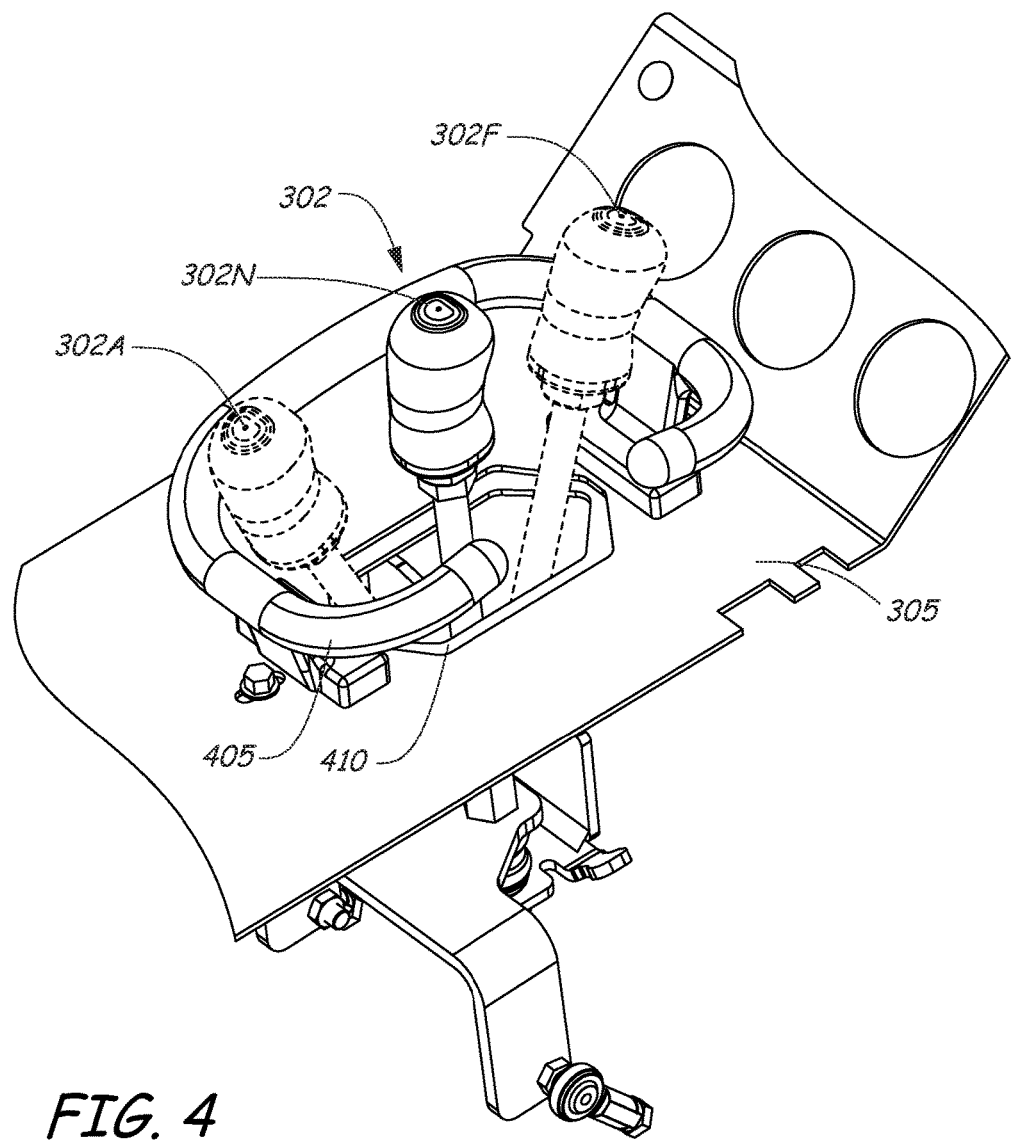
FIG. 4 is a perspective illustration of a joystick controller and a reference bar showing neutral, maximum forward (fore), and maximum rearward (aft) positions of the joystick controller according to one illustrative embodiment.

Referring now to FIG. 4, shown in isometric view is a two-axis joystick embodiment of joystick controller 102 for controlling functions of the power machine. While in some exemplary embodiments joystick controller 302 is a two-axis joystick, this need not be the case in all embodiments. Joystick controller 302 is representative of such alternate single-axis joysticks as well.

As discussed above, one example of a function controlled by joystick 302 is control of travel of the power machine. As such, in two-axis embodiments joystick 302 can be operated in an "ISO pattern", with a first direction of travel (fore and aft) being used to control travel speed as well as direction (i.e. forward or reverse) of travel. The second direction of travel (side-to-side) is used to control steering of the power machine in a left or right direction. In some exemplary embodiments, a reference bar 405 substantially surrounds the joystick 302 and is mounted to the control panel 305. The reference bar 405 provides a surface for an operator to rest his or her hand while operating the joystick.

Also in some embodiments, a throat plate 410 is included in or assembled to the control panel 305 to define and limit the range of motion of the joystick in at least one direction of movement. FIG. 4 illustrates joystick 302 in a neutral position 302N, a fore or forward position 302F, and a rearward or aft position 302A. A midpoint between the furthest most fore position 302F and the furthest most aft position 302A is represented by a vertically extending reference line 520 (shown in FIG. 5). The neutral position 302N of joystick 302 is biased such that, in this neutral position, the joystick is oriented aft of center (represented by line 520). This allows for a longer stroke in the forward direction relative to the aft direction, while the throat plate 410 limits travel in the side-to-side direction and/or the aft direction. Having the neutral position 302N located aft of center allows the forward stroke to be substantially non-limited by the throat plate, thereby allowing maximum forward travel speed. As will be discussed below in greater detail, the throat plate configuration does limit steering speed and reverse travel speed. In other embodiments, the throat plate configuration can limit travel velocity in any direction or combination of directions. While some exemplary embodiments include both reference bar 405 and throat plate 410, other exemplary embodiments can include either of these features without the other.

Figure 5:
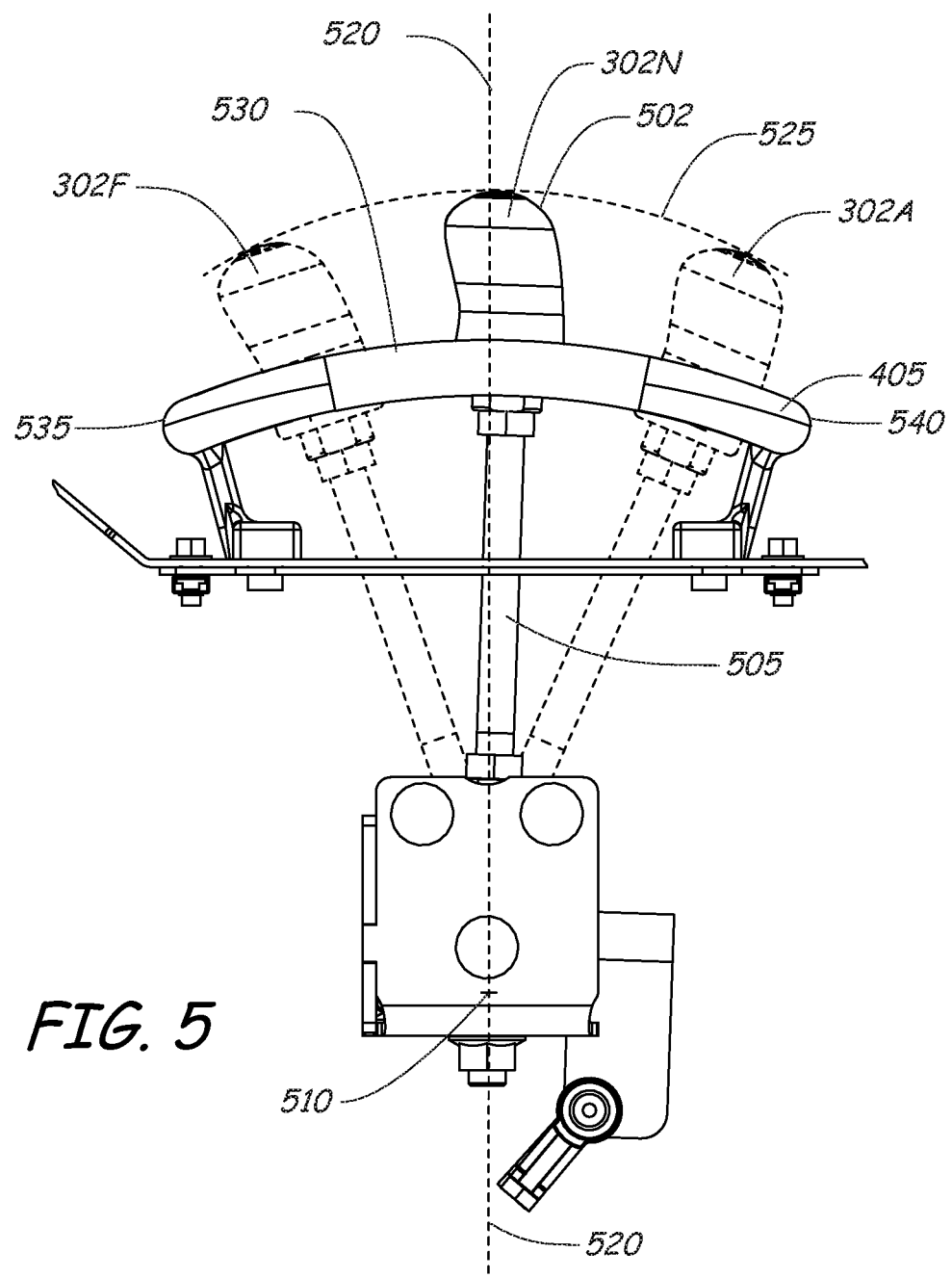
FIG. 5 is a left side elevation view of the joystick controller and reference bar of FIG. 4 showing neutral, maximum fore, and maximum aft positions of the joystick controller.
Figure 6:
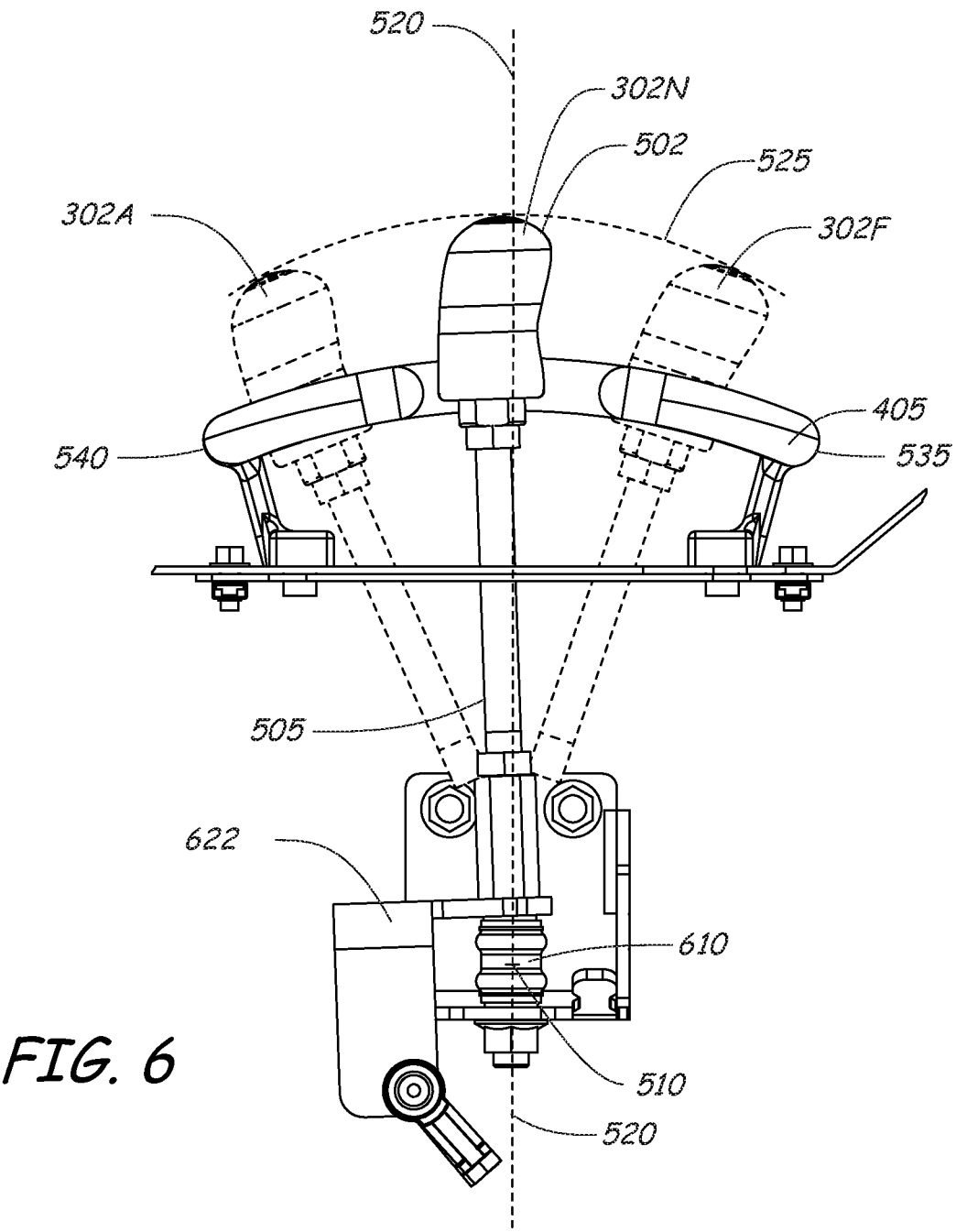
FIG. 6 is a right side elevation view of the joystick controller and reference bar of FIG. 4 showing neutral, maximum fore, and aft positions of the joystick controller.
Figure 7:
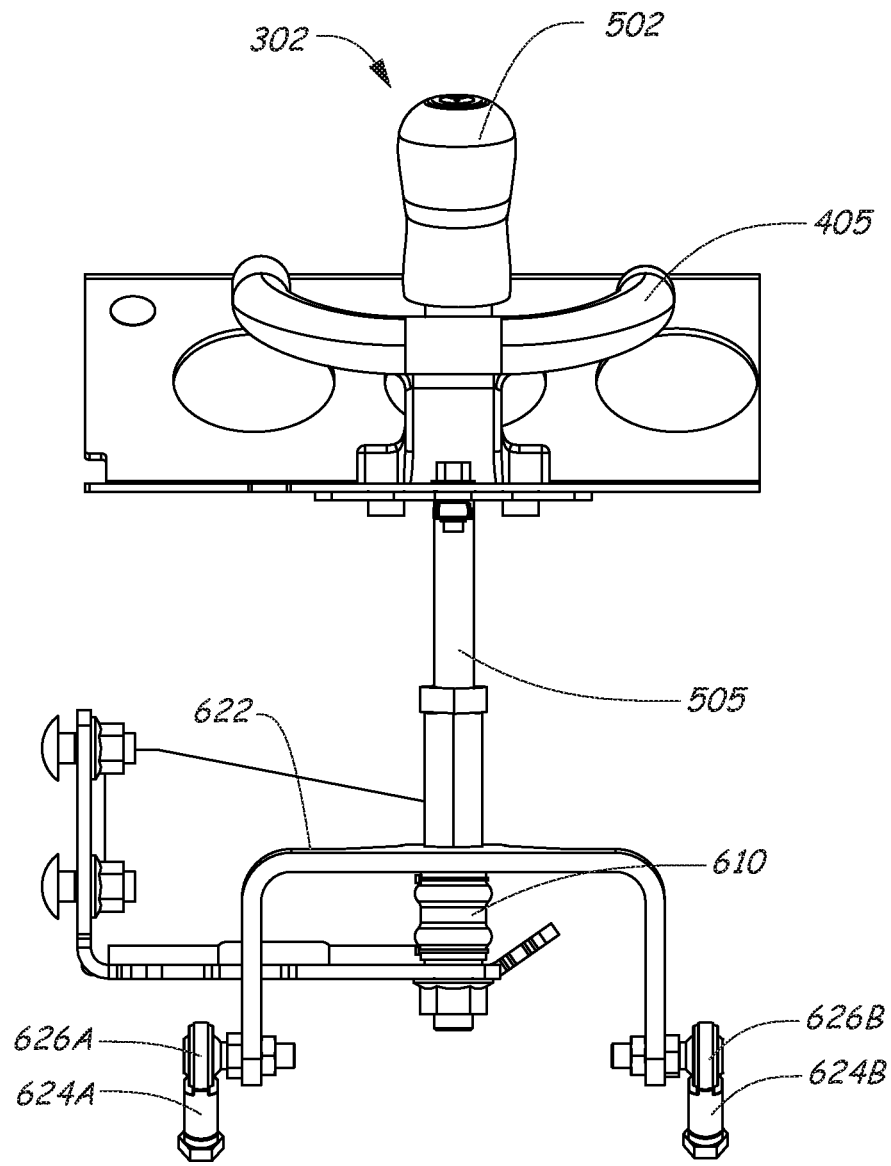
FIG. 7 is a rear elevation view of the joystick controller and reference bar of FIG. 4.
Figure 8:
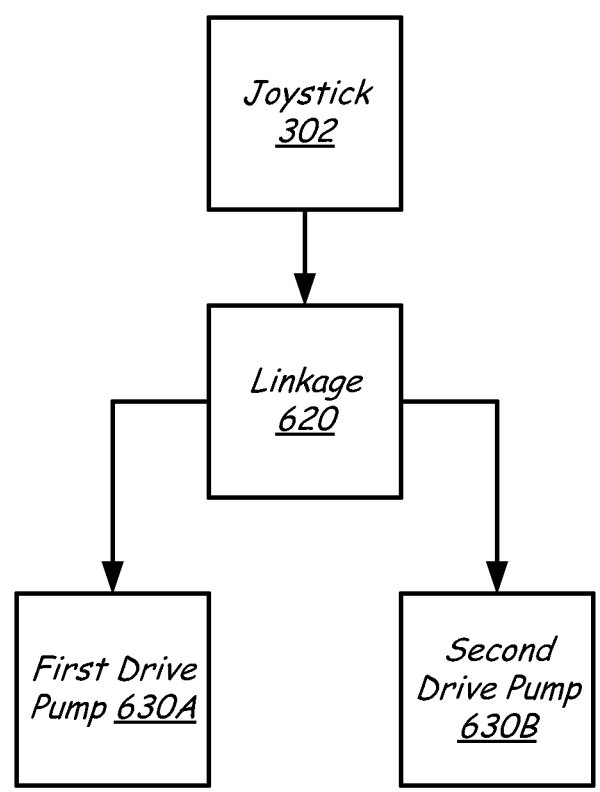
FIG. 8 is block diagram illustrating the relationship between a joystick suitable for use on a representative power machine and drive pumps mounted on the power machine according to one illustrative embodiment.

Referring now to FIGS. 5-7, shown respectively are a left side view, a right side view, and a rear view of joystick 302 and reference bar 405 in one exemplary embodiment. In FIGS. 5 and 6, joystick 302 is again shown in the aft most position 302A, the neutral position 302N, and the fore most position 302F. A joystick handle 502 is connected to a joystick shaft 505 which pivots about a pivot point 510 at a pivot mechanism 610 (shown in FIG. 6). In this embodiment, the joystick 302 is manipulable by an operator to control a pair of drive pumps. Referring briefly to FIG. 8, a block diagram is shown that illustrates the relationship between joystick 302 and a pair of drive pumps 630A, 630B. Drive pumps 630A, 630B are left and right drive pumps, similar to left and right drive pumps 115, 120 shown in FIG. 1 and operate in a similar fashion to allow for skid steering. Linkage 620 is provided from the joystick 102 to the drive pumps 630A, 630B. Motion of the joystick 302 is thus translated to the drive pumps 630A, 630B through the linkage 620. Although the embodiments shown and described herein illustrate a joystick that is operably connected to a pair of drive pumps on a machine that accomplishes steering by skidding, the disclosure should not be read to limit application of the embodiments to the specific application in the illustrative embodiments. In other embodiments, the joystick may be connected to a single drive pump, a valve, or any other target mechanism that the joystick system described herein may be advantageously used to control.

FIGS. 5-7 show a portion of one embodiment of linkage 620. A yoke 622 is coupled to the joystick shaft 505 and moves with the joystick shaft. A pair of control rods 624A, 624B is operably coupled to the yoke 622—in this embodiment via swivel joints 626A, 626B—and to their respective drive pumps 630A, 630B (not shown FIGS. 5-7). The geometric arrangement of the linkage translates motion of the joystick 302 to the drive pumps 630A, 630B generally similar to what is known as the "ISO pattern" for drive control, but with some differences, as is described below.

As again shown in FIGS. 5 and 6, reference bar 405 provides a curved top surface 530, which in the illustrated embodiment extends between the fore or forward most reference bar position 535 and the aft or rearward most reference bar position 540. It should be noted that, as shown in FIG. 3, a reference bar can be primarily on the left side of a joystick or on a right side of a joystick. The reference bar 405 is shown in FIGS. 4-7 is for a reference bar mounted primarily on the left side of a joystick. If the same reference bar 405 is mounted on the right hand side of a joystick, the forward most position of the reference bar with be position 540 and the rearward most position would be position 535. This is also true for other embodiments discussed below, but for the purposes of brevity, forward and rearward positions will be discussed relative to the left hand position shown in FIGS. 4-7. In some embodiments, the curved top surface 530 of reference bar 505 curves in an arcuate manner between reference bar positions 535 and 540, and extends proximal to the path of movement of joystick 302 in the first direction of travel (fore and aft). In one embodiment, a vertical plane that extends through a substantial portion of the reference bar 405 that has the curved top surface 530 is at least approximately parallel to a vertical plane that extends through the most forward and rearward positions of the joystick 302. The curvature of the top surface 530 can be, in some embodiments, selected so that it has an approximate radius relative to pivot point 510 which is substantially the same as the radius of a fixed point on the joystick handle 502 or on the joystick shaft 505 relative to the pivot point 510. Thus, in some exemplary embodiments, in all positions of joystick 302 between the aft most position and the fore most position, the joystick handle 502 will extend above reference bar 405 by approximately the same amount. Thus, the top surface 530 on which the operator rests his or her hand while operating the joystick will allow consistent relationship between and operator's hand and the joystick handle 502 no matter where the joystick is positioned between the most fore and the most aft position. As discussed below with reference to the embodiments of FIGS. 10A-10D, for example, the top surface of the reference bar can curve in a similar arcuate manner between left and right sides of joystick.

Referring again to FIGS. 5 and 6, as discussed above, in neutral position 302N, joystick 302 is biased or installed to be oriented aft of center. In FIGS. 5 and 6, the center position located between the aft most joystick position 302A and the fore most joystick position 302F is represented by vertical reference line 520. FIGS. 5 and 6 each illustrate that joystick shaft 505 and handle 502 are oriented aft of vertically extending reference line 520. Again, this allows for a longer forward stroke than rearward stroke, limiting maximum rearward speed in comparison to maximum forward speed.

Figures 9A, 9B:
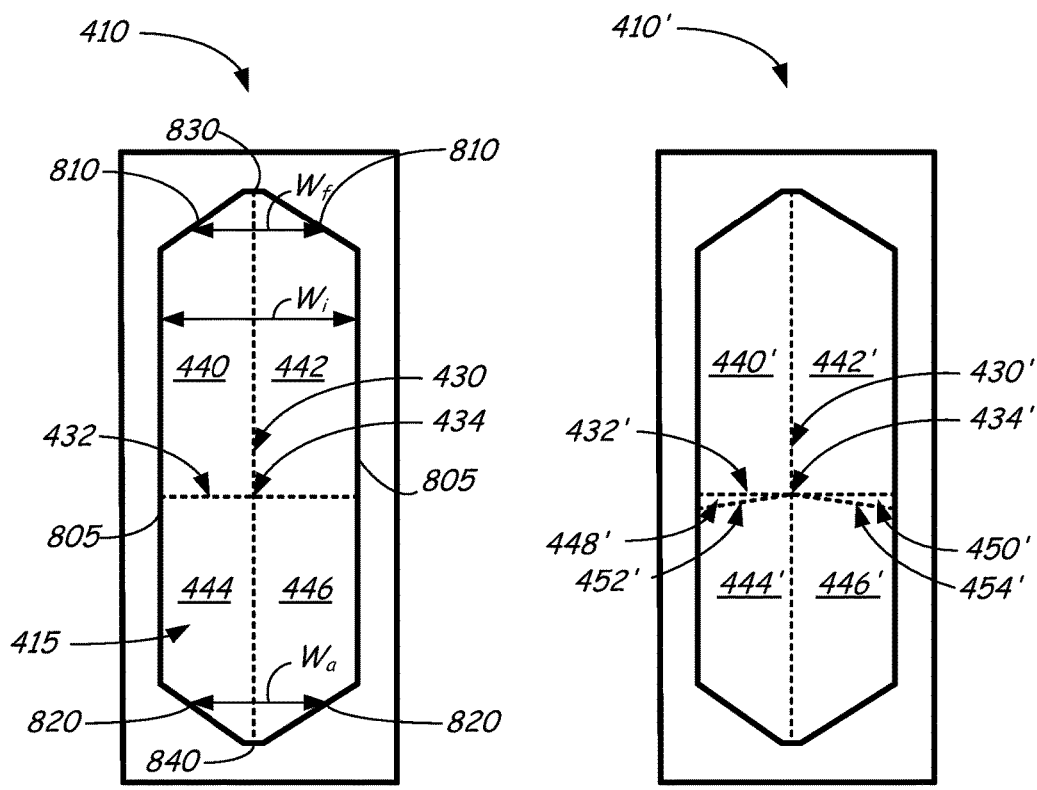
FIGS. 9A-9B illustrate a throat plate for use with a joystick controller to limit movement of the joystick controller in accordance with some exemplary embodiments.

Referring now to FIGS. 9A-9B, throat plate 410 is shown in more detail. The throat plate 410 is shown as having an aperture 415 through which the joystick extends. The aperture 415 is shaped to limit travel of the joystick at least in one direction and is, in the exemplary embodiment, of an elongated hexagon shape. The aperture 415 of throat plate 410 is defined by parallel side surfaces 805, which extend between tapering fore end surfaces 810 and tapering aft end surfaces 820. In this exemplary embodiment, side surfaces or sides 805 extend substantially parallel to each other such that an intermediate width $W_i$ between the sides 805 is substantially constant.

This allows for the operator to command left or right turns uninhibited by the throat plate, i.e. the shape of the throat plate at intermediate fore and aft positions does not limit stroke of the joystick. Alternatively, the throat plate may inhibit the left or right turns, but this inhibition would be relatively constant over the entire area of the throat plate that has an intermediate width $W_i$. However, in other embodiments, sides 805 need not be parallel, and can instead themselves be tapered or curved from a widest position near the center of the throat plate to narrower positions at the intersection between sides 805 and tapered surfaces 810 and 820 such that the power machine can be commanded to make the sharpest turns only at the lowest speeds, with the throat plate otherwise limiting side-to-side movement of the joystick and thereby limiting the sharpness of turns as the loader is moving faster.

Toward the fore most joystick positions, the width $W_f$ provided by tapered surfaces 810 continues to narrow to a minimum width adjacent the fore most position 830. Similarly, the width $W_a$ provided by the tapered aft surfaces 820 continues to narrow toward a narrowest position adjacent aft most position 840. Positions 830 and 840 are, in some embodiments, vertices of an elongated hexagonal shape. Thus, once the joystick is forward or rearward of the sides 805, the tapered surfaces 810 and 820 increasingly limit the side-to-side range of motion of the joystick, and thereby limit the commanded rate of turning at these higher forward and reverse speeds. Throat plate 410 limits joystick movement, and thereby power machine travel, in the side-to-side direction, and in the reverse direction (at aft most position 840). The throat plate 410, however, may not substantially limit (or limit at all) the turning capabilities of the loader at the most forward stroke insofar as the portion of the elongate shape of the throat plate 410 that tapers toward the forward end of the travel does not limit actual pump action, as drive pumps of the type shown herein often have built in limitations at their highest speeds. In other embodiments, the throat plate can be shaped to limit turning at highest speeds. The fore most position 430, at which forward joystick movement is stopped, can be at or near the forward joystick position corresponding to the maximum forward stroke for controlling the drive pumps 315 and 320. Thus, maximum forward travel speed is allowed, while reverse travel speed is limited, primarily because the intersection 434 where the joystick biased is closer to the aft most position 840 than the fore most position 830. Similarly, the steering speed is increasingly limited by the tapering widths $W_f$ and $W_a$ at the more forward stroke and reverse stroke positions of the joystick corresponding to higher travel speeds.

When installed, the joystick 302 is biased to a position defined as an intersection 434 of fore and aft axis 430 and side-to-side axis 432, with axes 430 and 432 representing the axes of movement of the joystick. As discussed above, this intersection 434 need not be in the exact middle of the aperture of the throat plate, and the intersection is shown as being toward the aft end of the aperture 415. The axes 430 and 434 define distinct joystick movement ranges 440, 442, 444, and 446. In some embodiments, the geometry of the linkage relative to the joystick is such that two axes 430, 432 also define distinct travel ranges, especially for power machines that accomplish turns by skidding. When the movement ranges 440, 442, 444, and 446 also define distinct travel ranges (i.e. forward-left 440, forward-right 442, forward-left 444, and forward-right 446); movement of the joystick 302 along fore and aft axis 430 will cause the power machine to travel straight, either forward or backward. Movement of the joystick along the side-to-side axis 432 will cause maximum turning in either to the left or the right. For skid-steer machines, movement of the joystick along the side-to-side axis will cause the machine to turn on a zero or near zero radius.

In some embodiments, however, the movement ranges need not correspond exactly to the travel ranges. One example of such an arrangement is shown in FIG. 9B. In this example, the linkage between the joystick and the drive pump(s) is such that the travel ranges in terms of where maximum turning is located is not exactly on the side-to-side axis 432', but rather along line 452' for left turns and along line 454' for right hand turns. In this instance, area 448' corresponds to a rearward left movement of the joystick and a forward left movement of the machine. Similarly, area 450' corresponds to a rearward-right movement of the joystick and a forward-right movement of the machine.

Referring now to FIGS. 10A-10D, shown are illustrations of an alternate reference bar 905 in accordance with some exemplary embodiments. Like reference bar 405, reference bar 905 includes a bar member, shown at 907, that provides a curved top surface 930 which extends between the fore or forward most reference bar position 935 and the aft or rearward most reference bar position 940. Bar member 907 is coupled at end positions 935 and 940, for example, to supports 915 and 920 configured to mount or attach the reference bar to the control panel 305 (not shown). The curved top surface 930 of reference bar 905 provides a surface for an operator to rest his or her hand while operating a joystick.

Like reference bar 405, the curved top surface 930 of reference bar 905 curves in an arcuate manner between reference bar positions 935 and 940, and extends proximal to the path of movement of a joystick (e.g., joystick 302) in the first direction of travel (fore and aft). Additionally, between left and right reference bar positions 945 and 950, reference bar 905 also curves in an arcuate manner and extends proximal to the lateral path of joystick movement in a second direction of travel. In some embodiments, the radius of curvature of laterally extending end portions 935 and 940 of reference bar 905 can the same as the radius of curvature of side portions 945 and 950 of reference bar 930 which extend in the fore and aft direction, though this need not be the case in all embodiments. The curvature of the top surface 930 can be, in some embodiments, selected so that it has an approximate radius relative to a joystick pivot point (e.g., pivot point 510 discussed above and shown in FIGS. 5 and 6) which is substantially the same as the radius of a fixed point on the joystick handle or on the joystick shaft relative to the pivot point. Thus, in some exemplary embodiments, in all or most joystick positions between the aft most position and the fore most position, or between the left most position and the right most position, the joystick handle will extend above reference bar 905 by approximately the same amount. Thus, the top surface 930 on which the operator rests his or her hand while operating the joystick will allow consistent relationship between and operator's hand and the joystick handle no matter where the joystick is positioned between the most fore and the most aft position.

Referring now to FIGS. 11A-11D, shown are illustrations of another alternate reference bar 1005 in accordance with some exemplary embodiments. Like reference bars 405 and 905, reference bar 1005 includes a bar member, shown at 1007, that provides a curved top surface 1030 which extends between the fore or forward most reference bar position 1035 and the aft or rearward most reference bar position 1040. Bar member 1007 is coupled at end positions 1035 and 1040, for example, to supports 1015 and 1020 configured to mount or attach the reference bar to a control panel (e.g., control panel 305 shown in FIG. 4). Again, the curved top surface 1030 of reference bar 905 provides a surface for an operator to rest his or her hand while operating a joystick.

Figure 11A:
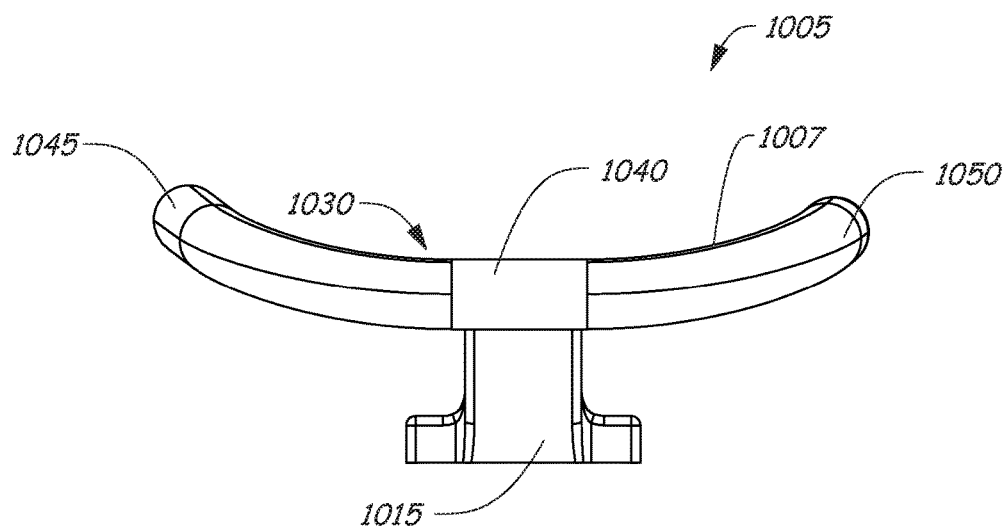
FIGS. 11A-11D are end, side, perspective, and top view illustrations, respectively, of yet another alternative exemplary reference bar embodiment.
Figure 11B:
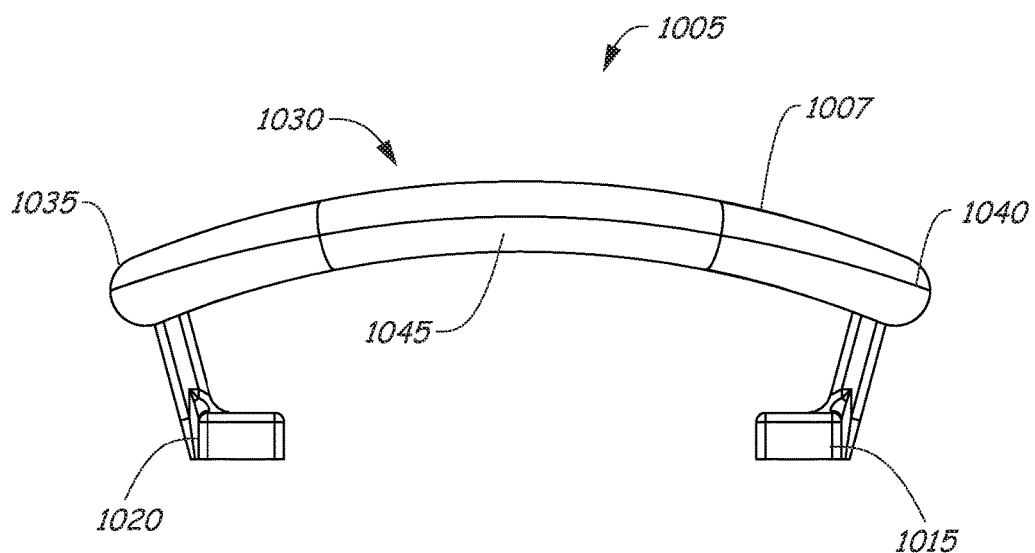
Figure 11C:
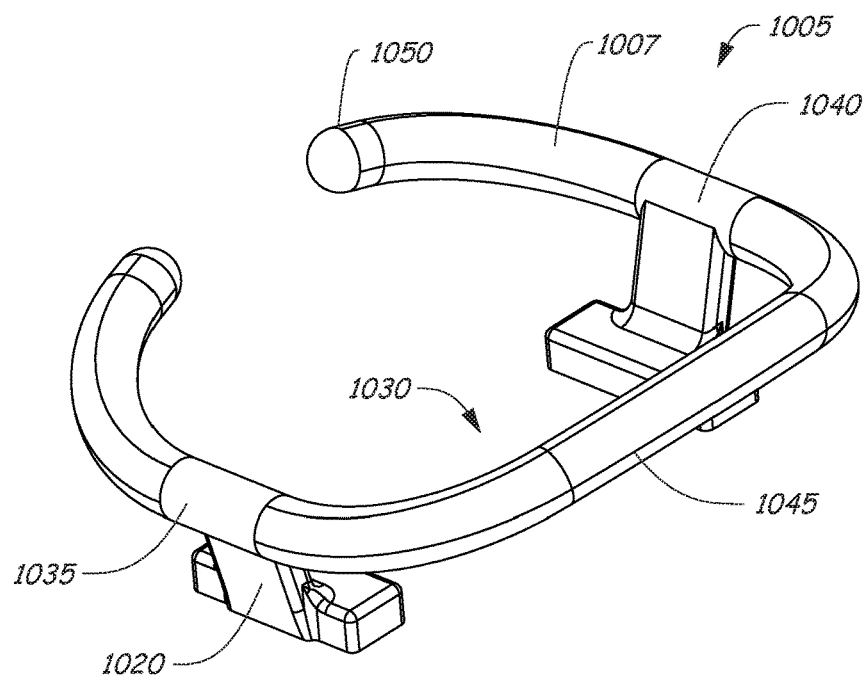

Like reference bars 405 and 905, the curved top surface 1030 of reference bar 1005 curves in an arcuate manner between reference bar positions 1035 and 1040, and extends proximal to the path of movement of a joystick (e.g., joystick 302) in the first direction of travel (fore and aft). Similar to other embodiments such as reference bars 405 and 905, the curvature of the top surface 1030 on side portions 1045 and 1050 can be selected so that it has an approximate radius relative to a joystick pivot point (e.g., pivot point 510 discussed above) which is substantially the same as the radius of a fixed point on the joystick handle or on the joystick shaft relative to the pivot point. However, unlike reference bar 905, reference bar 1005 need not be curved in an arcuate manner between left and right reference bar portions or positions 1045 and 1050. For example, as shown in FIG. 11A, end portions or positions 1035 and 1040 of reference bar 1005 can be vertically flattened or substantially parallel to the control panel in at least center regions of the end portions from a lateral extension perspective.

Figure 10A:
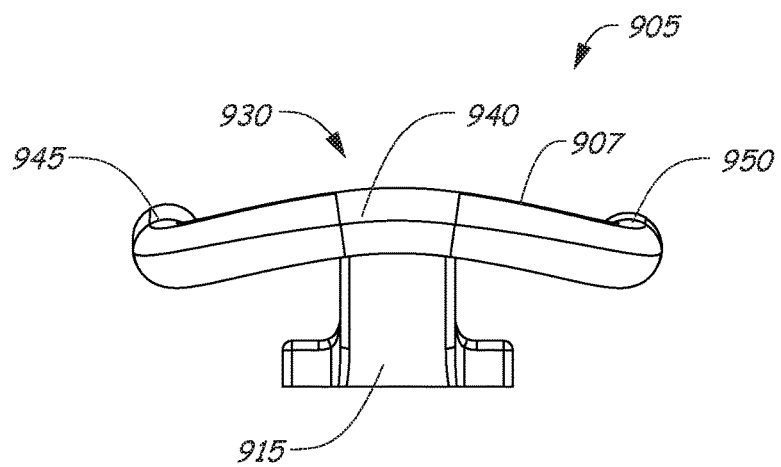
FIGS. 10A-10D are end, side, perspective, and top view illustrations, respectively, of an alternative exemplary reference bar embodiment.
Figure 10B:
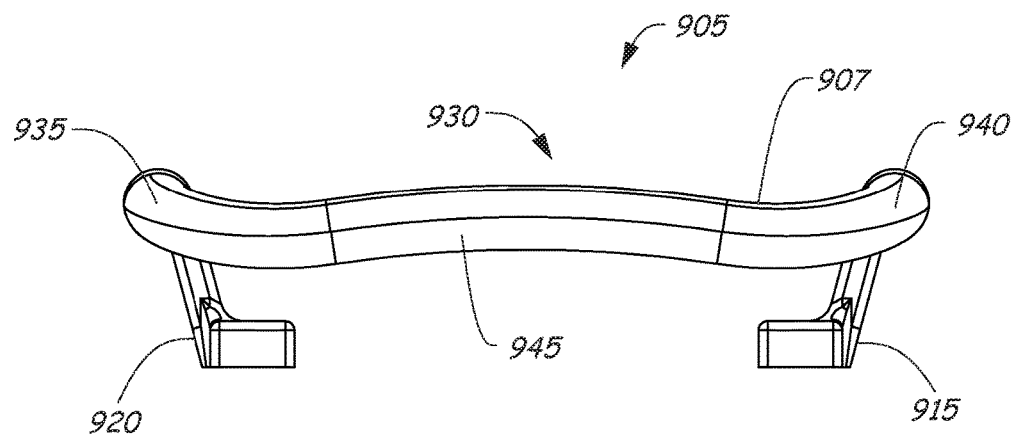
Figure 10C:
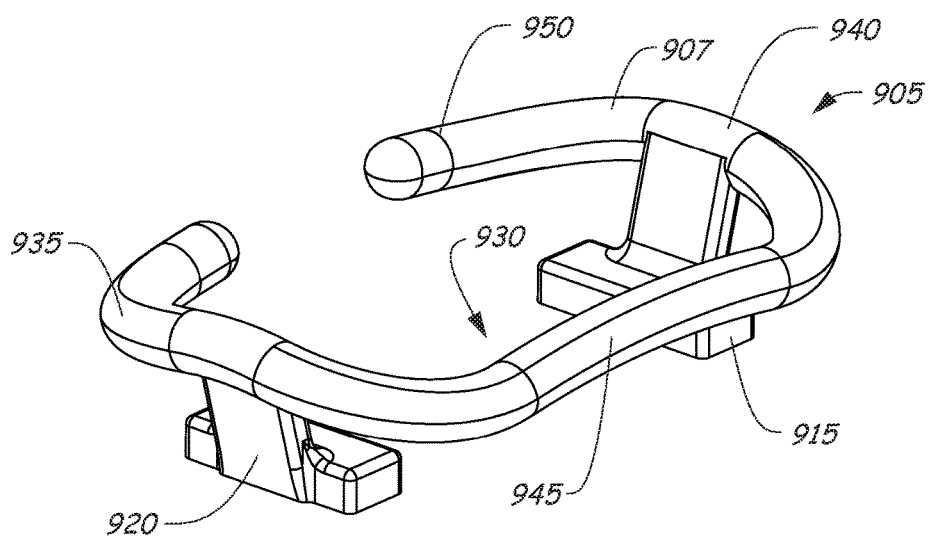
Figure 10D:
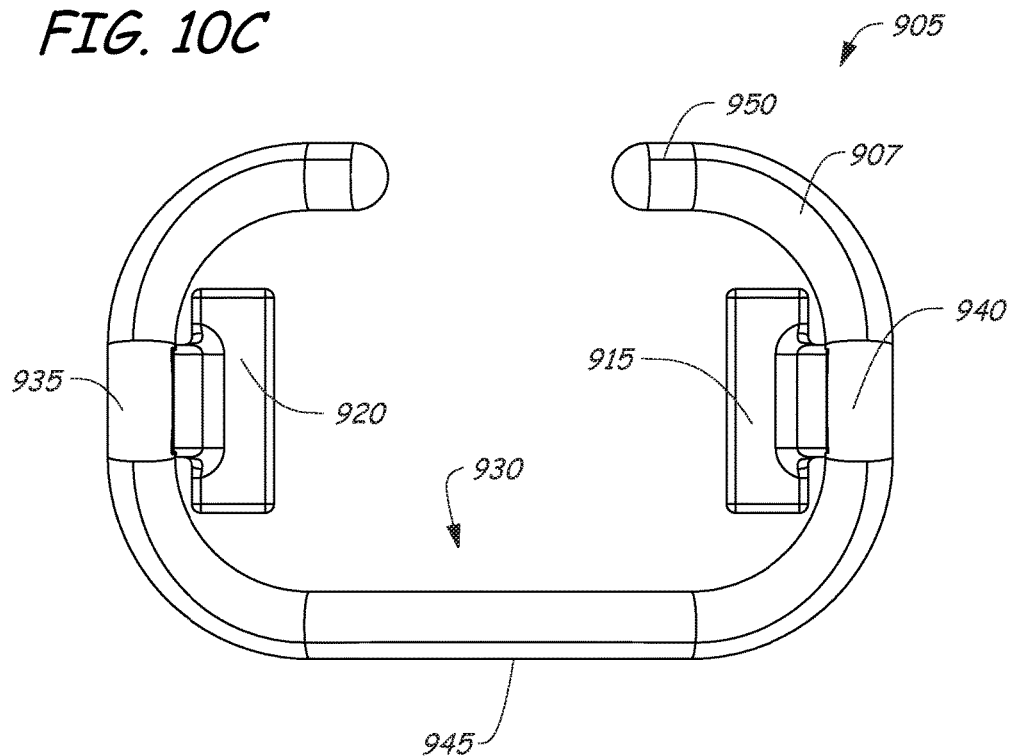
Figure 11D:
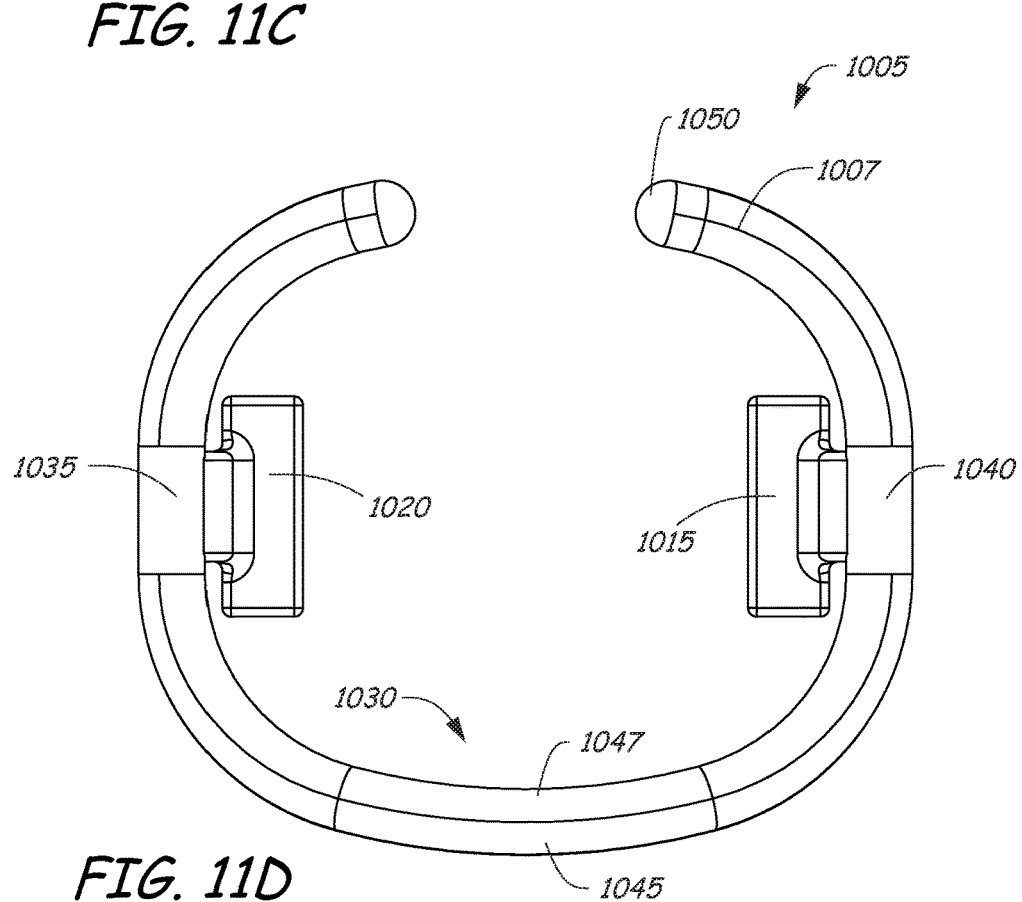

Also, in some embodiments, the curved surface 1030 of reference bar 1005 can include a curvature laterally, or with a component in a lateral plane, such that left and/or right reference bar portions 1045 and 1050 are furthest away laterally from a neutrally positioned joystick. FIG. 11D illustrates such lateral curvature in reference bar portion 1045. By comparison, corresponding reference bar portion 945 of reference bar 905 shown in FIG. 10D is shown to extend between reference bar portions or positions 935 and 940 without such lateral curvature.

The embodiments above provide several advantages. In particular the throat plate is advantageously employed to shape the travel control speed of the power machine. In addition, the reference bar provides an improved ability for an operator to precisely and easily control movement of a joystick.

Although the subject matter has been described in language specific to structural features and/or methodological acts, it should be understood that the subject matter defined in the appended claims is not necessarily limited to the specific features or acts described above. Rather, the specific features and acts described above are disclosed as example forms of implementing the claims. For example, in various embodiments, different types of power machines can include joystick controllers having one or more of the disclosed concepts. Similarly, electronic joystick controllers, mechanically linked joystick controllers, hydraulically linked joystick controllers, and combinations thereof can include one or more of the disclosed concepts. Further still, while a single joystick having a reference bar and/or a throat plate is shown, multiple joysticks having one or both of a reference bar and a throat plate can be utilized. Other examples of modifications of the disclosed concepts are also possible, without departing from the scope of the disclosed concepts.

What is claimed is:

1. A power machine comprising:
   a frame;
   a tractive element;
   a hydraulic drive pump;
   a drive motor coupled to the hydraulic drive pump to receive hydraulic power from the hydraulic drive pump;
   a control panel connected to the frame;
   a joystick mounted to the frame and extending through the control panel to provide control signals for controlling the hydraulic drive pump, the joystick biased to a neutral position and configured to be moved fore and aft of the neutral position; and
   a reference bar coupled to the control panel, surrounding the joystick, and including a curved top surface extending between a fore most reference bar position and an aft most reference bar position, and wherein between the fore most reference bar position and the aft most reference bar position a side of the reference bar follows an arc of the joystick as the joystick moves between a fore most joystick position and an aft most joystick position.

2. The power machine of claim 1, and further comprising a joystick range of movement limiting mechanism configured to define a total range of movement of the joystick.

3. The power machine of claim 2, wherein the joystick range of movement limiting mechanism comprises a throat plate in the control panel, the throat plate having an aperture and the joystick extending through the aperture of the throat plate.

4. The power machine of claim 3, wherein the throat plate aperture has tapered fore end surfaces and tapered aft end surfaces to reduce left and right movement of the joystick as the joystick approaches the fore most position and the aft most position.

5. The power machine of claim 3, wherein the throat plate has side surfaces, between the tapered fore end surfaces and tapered aft end surfaces, spaced apart such that left and right movement of the joystick is not reduced by the throat plate in intermediate joystick positions fore and aft of the neutral position.

6. The power machine of claim 1, wherein the neutral position of the joystick is oriented aft of a center position between the fore most position and the aft most position such that a range of allowed joystick movement in the fore direction and corresponding forward travel speeds are greater than a range of allowed joystick movement in the aft direction and corresponding reverse travel speeds.

7. The power machine of claim 1, wherein between the fore most reference bar position and the aft most reference bar position, the joystick extends above the reference bar by substantially the same amount.

8. A reference bar configured to be coupled to a control panel of a power machine surrounding a joystick extending through the control panel, the reference bar comprising:
   a curved top surface extending between a fore most reference bar position and an aft most reference bar position, and wherein between the fore most reference bar position and the aft most reference bar position a side of the reference bar follows an arc of the joystick as the joystick moves between a fore most joystick position and an aft most joystick position.

9. The reference bar of claim 8, wherein the reference bar curves in an arcuate manner such that in all positions of the joystick, the joystick extends above the reference bar by substantially the same amount.

10. The reference bar of claim 8, wherein the reference bar has a radius, relative to a pivot point of the joystick, which is substantially the same as a radius of a fixed point on the joystick relative to the pivot point, and wherein between the fore most reference bar position and the aft most reference bar position, the reference bar radius, relative to the pivot point of the joystick, is substantially the same as the radius of the fixed point on the joystick relative to the pivot point.

11. The reference bar of claim 10, wherein the curved top surface of the reference bar further extends between a left most reference bar position and a right most reference bar position, wherein between the left most reference bar position and the right most reference bar position, the reference bar radius, relative to the pivot point of the joystick, is substantially the same as the radius of the fixed point on the joystick relative to the pivot point.

12. The reference bar of claim 8, wherein the curved top surface of the reference bar extends between a left most reference bar position and a right most reference bar position, wherein between the left most reference bar position and the right most reference bar position, the reference bar radius, relative to the pivot point of the joystick, is substantially the same as the radius of the fixed point on the joystick relative to the pivot point.

13. The reference bar of claim 10, wherein between the fore most reference bar position and the aft most reference bar position, at least one of left and right portions of the reference bar curve laterally.

* * * * *